Patented Sept. 28, 1943

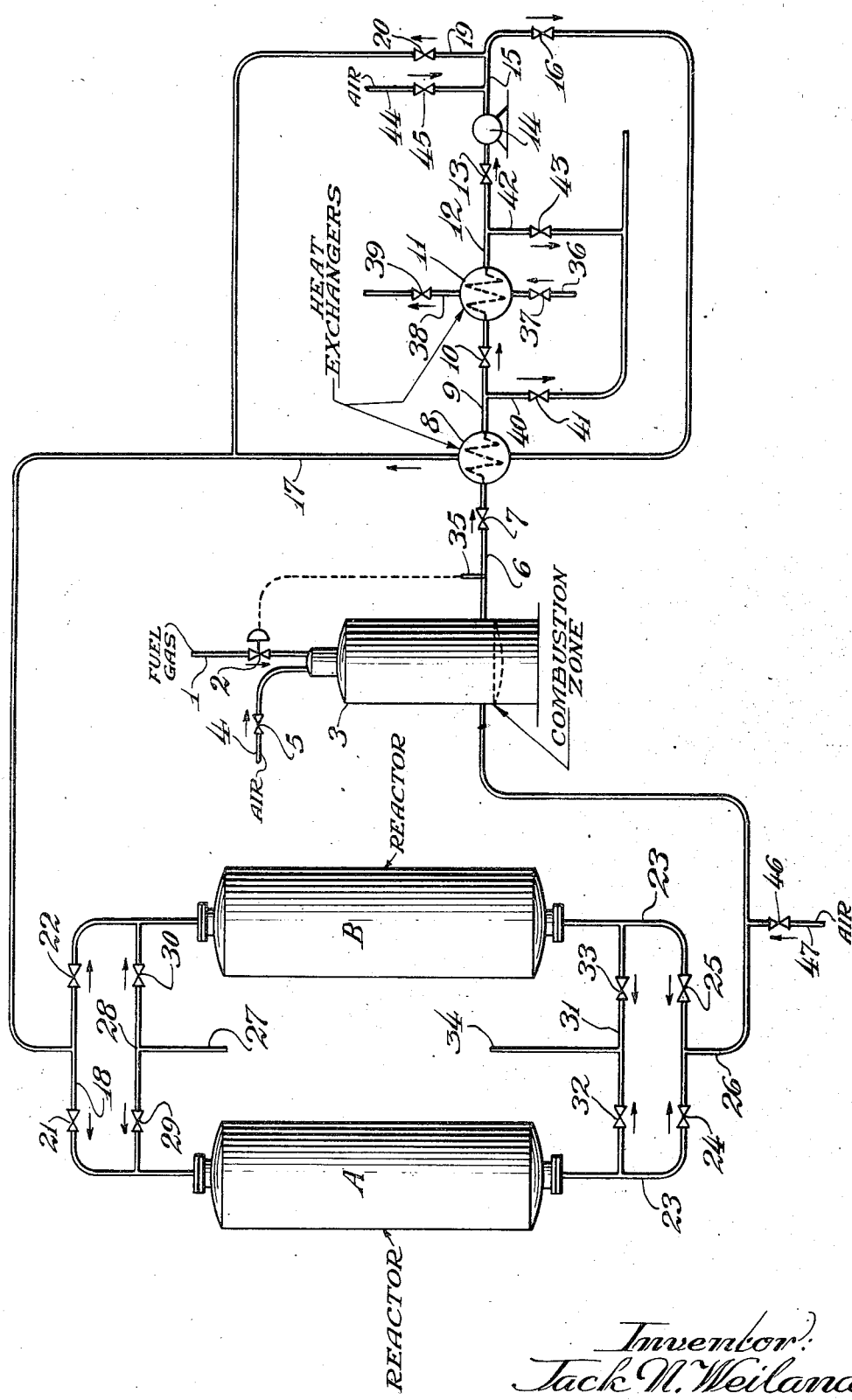

2,330,462

UNITED STATES PATENT OFFICE 2,330,462

REGENERATION OF CONTACT MATERIALS

Jack N. Weiland, Chicago, Ill., assignor to Universal Oil Products Company, Chicago, Ill., a corporation of Delaware Application November 25, 1940, Serial No. 367,151

2 Claims. (Cl. 252—242)

This invention relates to improvements in the methods of reactivating used contact masses upon which carbonaceous substances have deposited during conversion of hydrocarbon reactants and more specifically it relates to a method for obtaining uniform operation of the regenerating equipment by careful regulation and control of the temperature of the used regenerating gases leaving the combustion zone in which the combustible materials contained in said used regenerating gases are burned to avoid recirculating the same to the reaction zone and creating temperatures within said reaction zone damaging to the contact masses.

In the regeneration of contact masses such as catalyst for effecting cracking, reforming, or other conversion reactions of hydrocarbon reactants wherein air or oxygen-containing gases are employed for accomplishing such regeneration by the combustion of the carbonaceous substances, carbon monoxide will ordinarily be formed in the combustion reaction and in addition unconverted hydrocarbon reactants may be present, which if returned to the reaction zone as a part of the fresh regenerating gases, combustion of such materials may increase the temperature reached in regeneration to a point beyond that which contact material may withstand without serious damaging effects. To avoid recycling the carbon monoxide and hydrocarbonaceous materials which may be present in the used regenerating gases and as a means for increasing the heat energy of such gases, it is now general practice to pass the regenerating gases through a combustion zone, either catalytic or non-catalytic, wherein the combustible materials are converted to carbon dioxide and water and heat energy thus formed together with the available heat of such gases above the operating temperature utilized for power generation or recovered in suitable heat exchange steps for preheating fresh regenerating gases, charging stock for the process, or in the generation of steam, for example.

I have found that in regenerating systems, such as the one described above, temperatures of the used regenerating gases leaving the reaction zone and the carbon monoxide content of such gases may vary over relatively wide ranges from the start of the regenerating cycle to the end of such cycle. Usually at the start of the regenerating cycle combustion is more vigorous than at the end of the cycle, and usually hydrocarbonaceous materials left in the contact masses after processing are only present in the regenerating gases at the beginning of the regenerating cycle. As one would expect, therefore, temperatures at the start of the regenerating cycle are apt to be considerably higher than at the close of the regenerating cycle and due to these higher temperatures the carbon monoxide content of such used regenerating gases may also be higher than at the close of the cycle. With variable compositions of combustible materials in the used regenerating gases and variable temperatures of the stream leaving the reaction zone, the temperature of the used regenerating gases leaving the combustion zone above mentioned are also apt to vary over a wide temperature range. These variations in temperature and hence in the amount of heat produced, since the quantity of regenerating gases will remain substantially constant from the start of the regenerating cycle to the close of the cycle, cause considerable difficulty in the design and operation of the heat exchange equipment. In such cases the heat exchange equipment must be designed for minimum or maximum loads or else by-passes on some of the heat exchange equipment must be provided so that it can operate at a uniform load and fluctuations in the heat load taken up in another heat exchange step which is specifically designed for such type of operation. By-passes, however, in a system, such as the one under consideration, may involve the use of relatively large size piping and valves, and since the latter are usually difficult to control fluctuations in operation may still be present.

In view of the above, I provide for burning a variable amount of fuel gas in the combustion zone, the amount of gas burned in such zone being controlled so that the temperature of the gases leaving the zone remains substantially constant. For this purpose a temperature control device may be installed in the exit line of the combustion zone which controls the amount of fuel gas entering the combustion zone. By this method, fluctuations in a system, such as that above mentioned, will be small, if any, and the heat exchange equipment, compressor, and the like, may be designed to operate at a substantially constant temperature.

One other object of this invention is to provide an improved method for starting the operation. This may be accomplished by burning fuel gas in the combustion zone and recycling the combustion gases formed in this manner through the reaction zone in contact with the contact material contained therein to heat the same to the desired reaction temperature. In systems employing contact material which may be damaged to some extent where steam is allowed to condense thereon, fuel gas may be burned in the combustion zone in the presence of a high excess of air thus lowering the concentration of moisture in the resulting combustion products thereby lowering its dew point so that little or no condensation occurs in the heating operation. After the bed or beds of contact material have been brought to a temperature above the condensing temperature of the steam present in the combustion gases burning in the presence of a high excess of air may be cut out and a normal excess of air employed.

In one specific embodiment the invention comprises supplying used regenerating gases leaving the reaction zone to a combustion zone wherein combustible materials are substantially removed by burning, simultaneously supplying during at least a part of the regenerating cycle fuel gas to said combustion zone in an amount sufficient to maintain a uniform temperature of the gases leaving said combustion zone, cooling the gases leaving said combustion zone by indirect heat exchange with cooler materials and returning at least a portion thereof after replenishing the oxygen content as fresh regenerating gases to the reaction zone.

Available heat in the used regenerating gases may be utilized for industrial purposes, such as the generation of steam or in power production or for preheating the charge, when desired. In some cases, also, it may be necessary to operate the recirculating gas compressor at relatively low temperatures, and in such systems the used regenerating gases may be cooled down to a temperature at which the compressor will handle them and thereafter reheated to the temperature desired in regeneration by indirect heat exchange with the hot combustion gases leaving the combustion zone.

The accompanying diagrammatic drawing illustrates in conventional side elevation one specific form of the apparatus which may be employed to accomplish the objects of the invention.

Referring to the drawing, in starting up, that is, in the period preceding the regular operation when the contact material contained in the reaction zone is heated to the desired operating temperature, fuel gas of any desired composition, such as that ordinarily found in refineries, is supplied through line 1 containing flow control valve 2 into combustion zone 3. Simultaneously air is admitted to zone 3 through line 4 containing valve 5 preferably in sufficient excess when the contact material is cold to prevent condensation of water on such contact material, and combustion gases generated within this zone under at least a slight superatmospheric pressure. Combustion zone 3, in the case here illustrated, may comprise, for example, a chamber substantially filled with a contact material which aids in promoting oxidation of combustible material, such as carbon monoxide, and its application to this process will be described more fully later. On the other hand, chamber 3 may comprise a zone at least partially filled with a high temperature resisting material to form a relatively large surface to aid in promoting combustion of unburned face to aid in promoting combustion of unburned combustible material supplied to this zone in the manner to be described.

Combustion gases generated within zone 3 in the manner above described are directed through line 6 containing valve 7 and may pass through heat exchanger 8, line 9, valve 10, heat exchanger 11, line 12, and valve 13 to compressor 14. Preferably, however, for starting up, combustion gases in line 6 by-pass the heat exchange steps and are supplied directly to compressor 14, and since the means for accomplishing this are well known, such means are not illustrated. Compressor 14 discharges through line 15 and the combustion gases may be directed through valve 16, heat exchanger 8, and line 17 into line 18 for use in the manner to be described, but since the heat exchange steps on the suction side of the compressor may be by-passed in the manner previously described, the gases discharged from the compressor into line 15 are preferably directed through line 19 and valve 20 into line 17 by means of which they are supplied to line 18.

In starting up, valves 21 and 22 in line 18 are preferably opened so that separate streams of the hot combustion gases pass in parallel into reactors A and B and the contact material contained therein heated to the desired operating temperature or when desired the reactors may be heated one at a time in which case hot combustion gases could be introduced to only one reactor at a time. Hot combustion gases leaving reactors A and B by way of manifold line 23 pass through valves 24 and 25 into line 26 by means of which they are returned to zone 3 and thereafter recycled with the freshly generated combustion gases from zone 3 until the desired heating operation is completed.

After the contact material in reactors A and B has been brought up to the desired operating temperature the contact material in at least one of the reactors is employed in processing hydrocarbon reactants while the contact material in the other or others is constantly being heated until the end of the first processing cycle in the reactor or reactors employed in processing. In the accompanying drawing only two reactors are shown for the purpose of simplifying the sketch, however, it should be understood that a plurality of reactors may be employed with substantially no change in the method of operation. Hydrocarbon reactants may be supplied to reactors A or B by way of lines 27 and 28 and valves 29 and 30, respectively, and conversion products are withdrawn through line 31, valves 32 or 33, and line 34.

When the deposition of carbonaceous substances begins to effect the activity of the contact material in the reactor employed in processing or at some predetermined time as determined by experiments, the flow of hydrocarbon reactants is switched from one reactor to the other and the contact material contained in the reactor previously employed in processing is subjected to regeneration. Preferably also, and in accordance with the objects of the invention, the reactor used in processing is purged of hydrocarbon reactants with an oxygen-free gas before regeneration is started. Purging before regeneration may be accomplished by passing steam through the reactor and/or by passing an inert fluid medium, such as combustion gases containing substantially no oxygen, through said reactor. At the start of the first regeneration cycle the regenerating medium may comprise, for example, a portion of those gases employed for heating the contact mass to an operating temperature preferably containing controlled amounts of air supplied in the manner to be described to effect oxidation or combustion of the carbonaceous materials left on the mass of contact material. Subsequently, of course, that is, in successive regeneration cycles the regenerating medium will comprise those gases which have been employed in the previous regeneration of the carbonaceous material contained in a companion reactor.

Regenerating gases, in the case here illustrated, are directed through either valves 21 or 22 into reactors A or B and used regenerating gases are withdrawn from reactors A or B by way of manifold line 23 and valves 24 or 25 into line 26. Used regenerating gases in line 26 are preferably commingled with an excess of air introduced by way of line 27 and valve 28 and the mixture supplied to combustion zone 3. The used regenerating gases at least during the early part of the regenerating cycle will contain some hydrocarbonaceous materials left on the contact material after the processing operation and in addition will contain carbon monoxide substantially throughout the regenerating cycle. From an economical standpoint it is desirable to utilize these used reactivating gases after cooling the same and replenishing the oxygen content thereof as fresh regenerating gases. It is usually desirable therefore to remove the combustible components of the used regenerating gases before returning such gases to the reaction zone as fresh regenerating gases in order to minimize the amount of heat generated in the reaction zone and thus avoid damaging the contact material by high temperatures.

Removal of the combustible material may be obtained in zone 3 which contains an oxidation promoting catalyst as previously described. Ordinarily, the temperature of the regenerating gases both entering and leaving zone 3 will vary over a relatively wide range from the start of the regenerating cycle to the close of the cycle. Due to the difference in burning conditions as regeneration proceeds, to compensate for fluctuations in heat content and temperature of the regenerating gases leaving zone 3 the invention provides for supplying fuel gas, and air to zone 3 in the manner previously described and burning this mixture to form additional heat. The amount of gas supplied to zone 3 is preferably controlled so that the temperature of the outlet stream of gases leaving zone 3 remains substantially constant as determined by a thermal couple or some temperature recording device 35 which actuates control valve 2 in line 1.

Hot regenerating gases leaving zone 3 pass through line 6 containing valve 7 into heat exchanger 8 and pass in indirect heat exchange relationship with cooler regenerating gases in which the oxygen supply has been replenished for use as the fresh regenerating gas stream. Ordinarily, gas compressors handling hot regenerating gases will not successfully operate at temperatures much above 750° F., for which reason heat exchanger 8 is employed. Gases leaving heat exchanger 8 at a relatively high temperature are withdrawn through line 9 and at least a portion directed through valve 10 into heat exchanger 11. However, with gas compressors capable of operating at temperatures in the range of 800 to 900° F. the use of heat exchanger 8 may be obviated and in such case hot regenerating gases in line 6 pass through line 9 and at least a portion thereof are directed through valve 10 into heat exchanger 11. In any case, hot gases introduced to heat exchanger 11 pass in indirect heat exchange relationship with a cooler material introduced to heat exchanger 11 by way of line 36 and valve 37 and withdrawn therefrom by way of line 38 and valve 39.

Heat exchanger 11, in the case here illustrated, may comprise, for example, a waste heat boiler for the generation of steam or a heat exchanger for preheating hydrocarbon reactants or some similar heat exchange steps. The cooled regeneration gases leaving heat exchanger 11 are withdrawn by way of line 12 and at least a portion thereof directed through valve 13 to compressor 14. In the case here illustrated, provisions are made for withdrawing a portion of the regenerating gas before heat exchanger 11 by way of line 40 containing valve 41 or after heat exchanger 11 by way of line 42 containing valve 43 or both before and after heat exchanger 11 and the heat energy of these gases may be utilized in any suitable manner, such as, for example, in a gas turbine, a steam generator, or similar devices. The amount of gases withdrawn from lines 40 and 42 corresponds to the amount of excess regenerating gases not required for use as fresh regenerating gases.

Regenerating gases supplied to compressor 14 are discharged from line 15 and the oxygen concentration of such gases replenished by means of air supplied from line 44 containing valve 45 and this mixture supplied as the fresh regenerating gas mixture to the reaction zones by directing the same through valve 16, heat exchanger 8, line 17, and valve 18 into either of the reactors A or B. In systems not employing the heat exchange step, such as that performed by heat exchanger 8, the fresh regenerating gas mixture in line 15 may be directed through line 19 containing valve 20 into line 17 by means of which they are introduced to manifold line 18 and thence to reactors A and B.

I claim as my invention:

1. A process for regenerating a solid catalyst contaminated with a carbonaceous deposit which comprises forcing a heated oxygen-containing gas through said catalyst to burn carbonaceous contaminants from the catalyst, withdrawing the resultant combustion products containing combustibles from the catalyst and adding an oxygen-containing gas thereto, substantially burning the combustibles together with added fuel in a combustion zone, varying the amount of said added fuel to maintain a substantially uniform temperature on the gases leaving the combustion zone, and returning combustion gases from said zone, together with oxygen, to the catalyst undergoing regeneration.

2. A process for regenerating a solid catalyst contaminated with a carbonaceous deposit which comprises forcing a heated oxygen-containing gas through said catalyst to burn carbonaceous contaminants from the catalyst, withdrawing the resultant combustion products containing combustibles from the catalyst and adding an oxygen-containing gas thereto, substantially burning the combustibles together with added fuel in a combustion zone, varying the amount of said added fuel to maintain a substantially uniform temperature on the gases leaving the combustion zone, recovering heat from the gases leaving the combustion zone and adding oxygen thereto, and returning admixed combustion gases and oxygen to the catalyst undergoing regeneration.

JACK N. WEILAND.